(12) United States Patent
Robinson et al.

(10) Patent No.: US 9,592,422 B2
(45) Date of Patent: Mar. 14, 2017

(54) FOOT POSITIONING DEVICE

(71) Applicants: Matthew J. Robinson, Hopewell, OH (US); Christopher Stevens, Zanesville, OH (US)

(72) Inventors: Matthew J. Robinson, Hopewell, OH (US); Christopher Stevens, Zanesville, OH (US)

(*) Notice: Subject to any disclaimer, the term of this patent is extended or adjusted under 35 U.S.C. 154(b) by 0 days.

(21) Appl. No.: 14/590,006

(22) Filed: Jan. 6, 2015

(65) Prior Publication Data
US 2015/0190673 A1 Jul. 9, 2015

Related U.S. Application Data

(60) Provisional application No. 61/924,707, filed on Jan. 7, 2014.

(51) Int. Cl.
*A63B 24/00* (2006.01)
*A63B 23/08* (2006.01)
(Continued)

(52) U.S. Cl.
CPC ........ *A63B 23/08* (2013.01); *A63B 21/00043* (2013.01); *A63B 21/00069* (2013.01); *A63B 21/00185* (2013.01); *A63B 21/0552* (2013.01); *A63B 21/0557* (2013.01); *A63B 21/4011* (2015.10); *A63B 21/4013* (2015.10); *A63B 21/4015* (2015.10); *A63B 21/4025* (2015.10); *A63B 21/4043* (2015.10); *A63B 23/03508* (2013.01); *A63B 69/0059* (2013.01); *A63B 69/002* (2013.01); *A63B 69/0028* (2013.01); *A63B 2209/00* (2013.01); *A63B 2209/10* (2013.01); *A63B 2220/836* (2013.01); *A63B 2225/09* (2013.01); *A63B 2225/54* (2013.01); *A63B 2243/007* (2013.01); *A63B 2243/0025* (2013.01); *A63B 2244/20* (2013.01); *A63B 2244/203* (2013.01); *A63B 2244/22* (2013.01)

(58) Field of Classification Search
CPC .. A61F 5/14; A61F 5/0111; A61F 5/08; A63B 23/08; A63B 23/03508; A63B 21/00185; A63B 21/0552; A63B 21/0557; A63B 21/00043; A63B 21/00069; A63B 21/4043; A63B 21/4011; A63B 21/4013; A63B 21/4015; A63B 21/4025; A63B 69/002; A63B 69/0028; A63B 69/0059
See application file for complete search history.

(56) References Cited

U.S. PATENT DOCUMENTS

| | | | | |
|---|---|---|---|---|
| 5,776,090 A | * | 7/1998 | Bergmann | A61F 5/0111 128/882 |
| 5,799,659 A | * | 9/1998 | Stano | A61F 5/0111 128/882 |

(Continued)

*Primary Examiner* — Glenn Richman
(74) *Attorney, Agent, or Firm* — Benesch Friedlander Coplan Aronoff, LLP; Thomas Y. Kendrick

(57) ABSTRACT

Various embodiments of a foot positioning device are provided. In one embodiment, a foot positioning device is provided, the device comprising: a proximal strap operatively connected to at least one of an individual's ankle or lower leg; a distal strap operatively connected to the individual's foot; and a heel strap connected to the proximal strap and the distal strap; wherein the foot positioning device causes a moment that biases the individual's foot toward a plantar flexion position.

15 Claims, 11 Drawing Sheets

(51) Int. Cl.
    *A63B 23/035*     (2006.01)
    *A63B 21/00*     (2006.01)
    *A63B 21/055*     (2006.01)
    *A63B 69/00*     (2006.01)

(56) References Cited

U.S. PATENT DOCUMENTS

| | | | | |
|---|---|---|---|---|
| 5,833,640 | A * | 11/1998 | Vazquez, Jr. | A61F 5/0111 602/27 |
| 6,617,485 | B2 * | 9/2003 | Herzberg | A61F 13/066 602/23 |
| 6,641,550 | B1 * | 11/2003 | Johnson | A61F 5/0111 602/65 |
| 6,767,332 | B1 * | 7/2004 | Pardue | A61F 5/0111 128/882 |
| 7,115,105 | B2 * | 10/2006 | Cropper | A61F 5/0111 602/27 |
| 8,241,232 | B2 * | 8/2012 | Sanders | A61H 1/0266 36/11.5 |
| 8,246,562 | B2 * | 8/2012 | Colon | A61F 5/05 2/239 |
| 8,425,442 | B2 * | 4/2013 | Lundberg | A61F 5/0111 128/846 |
| 2011/0214315 | A1 * | 9/2011 | Mayer | A61F 5/14 36/140 |

* cited by examiner

FOOT POSITIONING DEVICE

CROSS-REFERENCE TO RELATED APPLICATIONS

This application claims priority from U.S. Provisional Patent Application No. 61/924,707, filed on Jan. 7, 2014, which is incorporated by reference herein in its entirety.

BACKGROUND

Various activities, and especially athletic activities, include a preferred positioning of a person's foot. For example, individuals learning to properly kick a soccer ball, or punt a football, may be instructed to place the foot in a preferred position, including the plantar flexion position of the ankle joint. In another example, individuals involved in gymnastics, ballet, diving, swimming, and the like, may be instructed to place the foot in a preferred position, which may include the plantar flexion position. Some individuals, especially children or novice athletes, may find it difficult to place the individual's foot in the preferred position, or to remember to maintain the individual's foot in the preferred position, during execution of the activity.

What is needed is a device for positioning an individual's foot in, or biasing an individual's foot toward, a preferred position for training an individual to properly execute an activity.

SUMMARY

In one embodiment, a foot positioning device is provided, the foot positioning device comprising: a proximal strap configured to connect to at least one of an individual's ankle or lower leg; a distal strap configured to connect to the individual's foot; and a heel strap configured to apply a force between the proximal strap and the distal strap; wherein the foot positioning device is configured to cause a moment configured to bias the individual's foot toward a plantar flexion position.

In another embodiment, a foot positioning device is provided, the foot positioning device comprising: a sock; a proximal strap integrally connected to the sock and configured to connect to at least one of an individual's ankle or lower leg; a distal strap integrally connected to the sock and configured to connect to the individual's foot; and a heel strap integrally connected to the sock and configured to apply a force between the proximal strap and the distal strap; wherein the foot positioning device is configured to cause a moment configured to bias the individual's foot toward a plantar flexion position.

In another embodiment, a foot positioning device is provided, the foot positioning device comprising: a shoe comprising a shoe attachment point; a proximal strap configured to connect to at least one of an individual's ankle or lower leg; and a heel strap configured to connect to the shoe attachment point and configured to apply a force between the proximal strap and the shoe; wherein the foot positioning device is configured to cause a moment configured to bias the individual's foot toward a plantar flexion position.

In another embodiment, a foot positioning device is provided, the device comprising: a proximal strap operatively connected to at least one of an individual's ankle or lower leg; a distal strap operatively connected to the individual's foot; and a heel strap connected to the proximal strap and the distal strap; wherein the foot positioning device causes a moment that biases the individual's foot toward a plantar flexion position.

In another embodiment, a foot positioning device is provided, the device comprising: a sock; a proximal strap integrally connected to the sock and operatively connected to at least one of an individual's ankle or lower leg; a distal strap integrally connected to the sock and operatively connected to the individual's foot; and a heel strap integrally connected to the sock and connected to the proximal strap and the distal strap; wherein the foot positioning device causes a moment that biases the individual's foot toward a plantar flexion position.

In another embodiment, a foot positioning device is provided, the device comprising: a shoe comprising a shoe attachment point; a proximal strap operatively connected to at least one of an individual's ankle or lower leg; and a heel strap operatively connected to the shoe attachment point and connected to the proximal strap; wherein the foot positioning device causes a moment that biases the individual's foot toward a plantar flexion position.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

Figure 1:
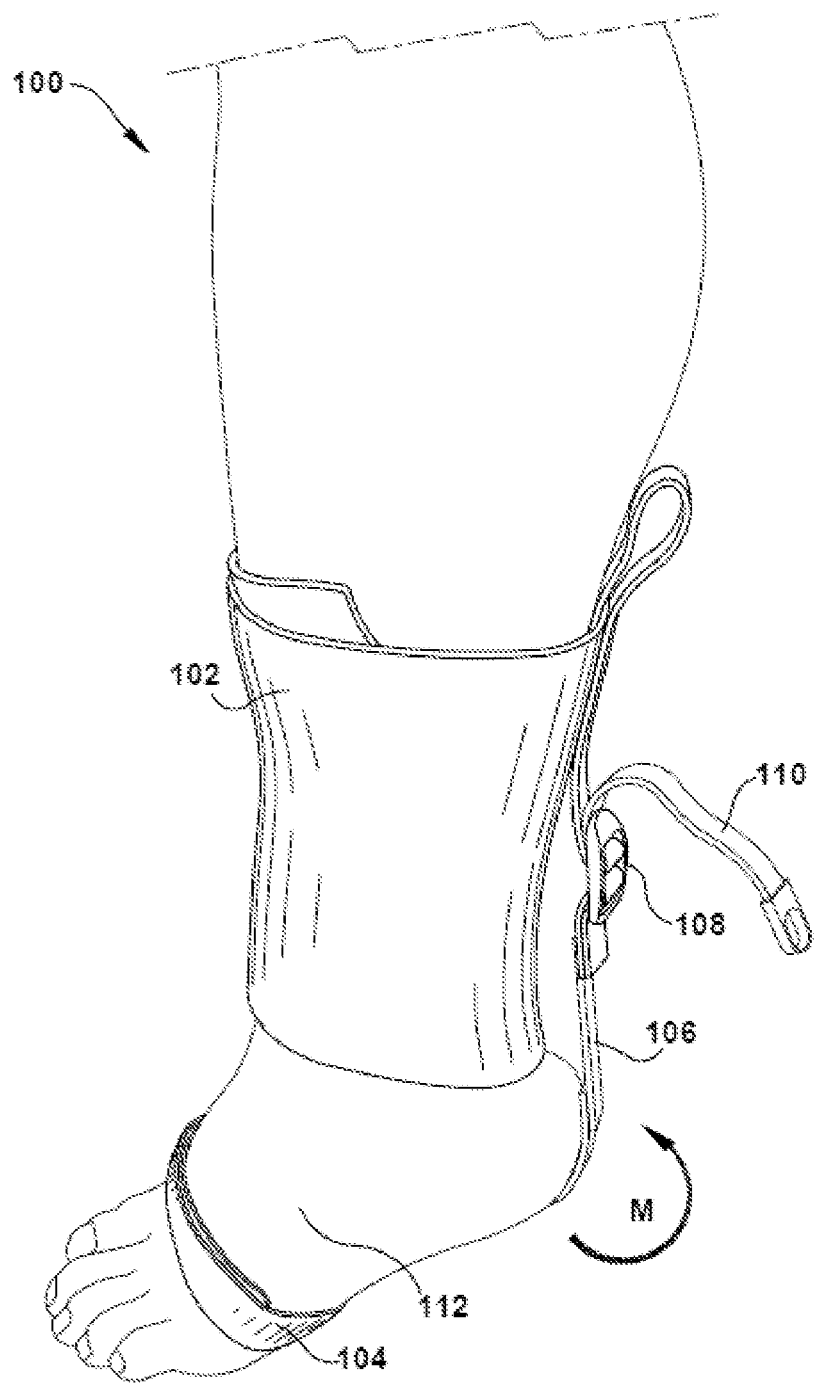
FIG. 1 illustrates a side perspective view of an example embodiment of a foot positioning device.

Teaching individuals proper foot placement for any of various activities, especially children or novice athletes, can be difficult. These individuals may not have significant experience with foot placement, ability to control foot placement, or muscle memory associated with proper foot placement for an activity. The foot positioning device described herein may be used to place an individual's foot in a preferred position for an activity. Alternatively, or additionally, the foot positioning device described herein may be used to bias an individual's foot toward a preferred position. The foot positioning device described herein may be used on an individual during training of the individual. The foot positioning device described herein may be used on an individual until the individual has developed the ability to maintain proper foot placement. The foot positioning device described herein may be used to facilitate and reinforce proper foot placement while developing correct technique and ensuring correct mechanics during both play and practice. The foot positioning device described herein may be configured to place an individual's foot in a preferred position upon an individual removing weight from the individual's foot. The foot positioning device described herein may be configured to bias an individual's foot toward a preferred position upon an individual removing weight from the individual's foot. The foot positioning device described herein may be configured to place an individual's foot in a preferred position, such as the plantar flexion position, upon an individual removing weight from the individual's ipsilateral lower extremity. The foot positioning device described herein may be configured to bias an individual's foot toward a preferred position upon an individual removing weight from the individual's ipsilateral lower extremity.

The foot positioning device described herein may incorporate an electronic device. The electronic device may include any of a variety of sensors, including for example: a force sensor, pressure sensor, load cell, or the like. The electronic device may include at least one accelerometer. The electronic device may be configured to measure any of a variety of factors pertinent to athletic activities, including for example: strike force, strike velocity, ball speed, ball spin, angle of swing in a kick, angle of a foot during the kick, number of repetitions, position on the field, and the like. The electronic device may include an identification device, including for example an RFID tag configured to track the user of the foot positioning device.

In one embodiment, a ball may include an electronic device configured to measure at least one of speed, force, spin, velocity, trajectory, and the like. The foot positioning device electronic device may communicate with the ball electronic device to measure any of the factors above, and the like, or may transmit data to a processor to determine a "good kick" versus a "bad kick." For example, the processor may compare strike velocity to ball velocity to determine the ratio therebetween, and may output an indication as to whether the kick was a "good kick" or a "bad kick" based upon a threshold value.

FIG. 1 illustrates a foot positioning device 100 including a proximal strap 102, a distal strap 104, and a heel strap 106. Heel strap 106 may include an adjustment mechanism 108, wherein heel strap 106 may be shortened/tightened or lengthened/loosened, including by manipulation of a tag end 110. As illustrated, an individual's foot 112 may be biased into a plantar flexion position.

Foot positioning device 100 may be placed on an individual's foot 112. Foot positioning device 100 may be used to train an individual to obtain and/or maintain proper foot placement for any of a variety of activities, including without limitation: kicking a soccer ball, kicking a football, gymnastics, diving, swimming, ballet, dancing, running, sprinting, physical therapy, and the like. It is contemplated that foot positioning device 100 may be used for positioning an individual's foot 112 in any desired position for any activity. Foot positioning device 100 may be configured to position an individual's foot 112 in a plantar flexion position.

In one embodiment, foot positioning device 100 may be worn over an individual's foot 112. Foot positioning device 100 may be worn beneath a sock, a shoe, a boot, or any combination thereof. Foot positioning device 100 may be worn over or beneath a sock, a shoe, a boot, or any combination thereof. Foot positioning device 100 may be worn over a shoe.

In one embodiment, foot positioning device 100 may include any of a variety of materials, including without limitation, a textile, a rubber, a polymer, a metal, an alloy, a composite, or the like. Foot positioning device 100 may include elastic materials, including in at least one of: proximal strap 102, distal strap 104, and heel strap 106. Elasticity in any of these materials may increase comfort, allow foot positioning device 100 to conform with movement of foot 112, or a combination thereof. Any of proximal strap 102, distal strap 104, and heel strap 106 may include a rubber backer configured to interact with foot 112, or a shoe (not shown) to increase comfort, increase traction/friction between foot positioning device 100 and foot 112 or a shoe (not shown), or a combination thereof.

Proximal strap 102 may be configured to be adjustably attached to an individual's ankle or lower leg. Proximal strap 102 may be configured to be attached to, or extend around, an individual's tibia and fibula. Proximal strap 102 may be configured to be attached to, or extend around, an individual's ankle joint. Proximal strap 102 may be configured to be attached to, or extend around, an individual's lower leg between an individual's knee and an individual's foot. Proximal strap 102 may include an attachment mechanism for securing proximal strap 102 to an individual's ankle or lower leg, including at least one of: a hook and loop fastener, a buckle, a strap, a clasp, a snap, a magnet, an adhesive, and a quick release buckle. Proximal strap 102 may include at least a portion of elastic to stretch to an individual's ankle or lower leg during movements. Proximal strap 102 may include at least a portion of adjustable material to form to an individual's ankle or lower leg during movements. Proximal strap 102 may include at least a portion of padding to maintain a comfortable fit on an individual's ankle or lower leg. Proximal strap 102 may be configured to fit either over, or under, an individual's shin guard, pads, or other sport equipment. Proximal strap 102 may be integrated into an individual's shin guard or other sport equipment. Other sport equipment may include a sport sock or sleeve.

Distal strap 104 may be configured to be adjustably attached to an individual's foot 112. Distal strap 104 may include an attachment mechanism for securing distal strap 104 to an individual's foot 112, including at least one of: a hook and loop fastener, a buckle, a strap, a clasp, a snap, a magnet, an adhesive, and a quick release buckle. Distal strap 104 may include at least a portion of elastic to stretch to an individual's foot during movements. Distal strap 104 may include at least a portion of adjustable material to form to an individual's foot during movements. Distal strap 104 may include at least a portion of elastic or adjustable material to accommodate an individual's foot during movements. Distal strap 104 may include at least a portion of padding to maintain a comfortable fit on an individual's foot 112. Distal strap 104 may be configured to fit either over, or under, an individual's shoe or boot. Distal strap 104 may be integrated into an individual's shoe or boot. Distal strap 104 may be integrated into an individual's sock.

Heel strap 106 may extend between proximal strap 102 and distal strap 104. Heel strap 106 may cause a force between proximal strap 102 and distal strap 104. Heel strap 106 may include an adjustment mechanism 108, wherein heel strap 106 may be shortened/tightened or lengthened/loosened, including by manipulation of a tag end 110. Heel strap 106 may be shortened or lengthened to cause more or less force, respectively, between proximal strap 102 and distal strap 104.

At least a portion of heel strap 106 may include an extensible material, such as an elastic or a bungee, configured to substantially stretch under force. At least a portion of heel strap 106 may include an inextensible material configured to not substantially stretch under force. Heel strap 106 may include a nylon material. Heel strap 106 may include a pad configured to be oriented between the remainder of heel strap 106 and foot 112, a user's ankle, a shoe (not shown), or the like. The pad may be configured to improve comfort, reduce abrasion, and the like.

At least a portion of heel strap 106 may extend posteriorly about an individual's heel. At least a portion of a heel strap 106 may alternatively, or additionally, extend laterally about an individual's heel. At least a portion of a heel strap 106 may alternatively, or additionally, extend medially about an individual's heel. The nature of the extension of heel strap 106 about an individual's heel may have a bearing on the manner in which an individual's foot 112 is biased by foot positioning device 100.

Orientation of heel strap 106 to extend posteriorly about an individual's heel may impart a moment M to the user's ankle about an axis extending substantially medially-laterally (substantially parallel to the frontal plane) relative to a user's ankle. Orientation of heel strap 106 to extend medially or laterally about an individual's heel or ankle may impart a moment M to the user's ankle about an axis extending substantially anteriorly-posteriorly (substantially parallel to the lateral plane) relative to a user's ankle.

Adjustment mechanism 108 may comprise any device configured to cause selective lengthening and shortening of heel strap 106. Adjustment mechanism 108 may comprise, for example, a strap adjuster, a triglide, a buckle, a bungee cord adjuster, a wind-up roller, or the like. Tag end 110 may be manipulated to shorten and/or lengthen heel strap 106. In one embodiment, tag end 110 is eliminated.

Heel strap 106 may be configured to cause a moment M in a counterclockwise direction (with reference to the illustration in FIG. 1), such that an individual's foot 112 is biased into a plantar flexion position. Alternatively, heel strap 106 may be configured to cause a moment M in any of a variety of directions, so as to bias an individual's foot 112 into any of a variety of desired positions, including for example: plantar flexion, plantar flexion with eversion, plantar flexion with inversion, and the like. Heel strap 106 may be configured to cause a moment M in any of a variety of directions upon removal of at least a portion of an individual's weight from an individual's foot 112. Heel strap 106 may be configured such that application of an individual's weight to an individual's foot 112 overcomes moment M, such that an individual's foot 112 can be oriented in a substantially neutral position with application of weight. Heel strap 106 may be configured such that application of an individual's weight to an individual's foot 112 overcomes moment M, such that an individual's foot 112 can be oriented in a substantially dorsal flexion position with application of weight.

In one embodiment, heel strap 106 is configured to apply a force between proximal strap 102 and distal strap 104. Force applied by heel strap 106 may be between about 44.0 N and about 222.0 N. Force applied by heel strap 106 may be between about 66.0 N and about 178.0 N. Force applied by heel strap 106 may be between about 89.0 N and about 133.0 N. Force applied by heel strap 106 may be between about 10% and about 40% of an individual's body weight. Force applied by heel strap 106 may be between about 15% and about 35% of an individual's body weight. Force applied by heel strap 106 may be about 25% of an individual's body weight. In one embodiment, heel strap 106 is configured to apply a force with any combination of the values recited herein.

Where heel strap 106 is an extensible material, decreasing the length of heel strap 106 may cause heel strap 106 to apply a greater force, while increasing the length of heel strap 106 may cause heel strap 106 to apply a lesser force. That is, the extensible material may have a spring rate, and the force applied by the extensible material may be directly related to the displacement of the extensible material multiplied by its spring rate. As a result, shortening heel strap 106 may cause greater displacement of heel strap 106, and thus greater force applied by heel strap 106. Lengthening heel strap 106 may cause lesser displacement of heel strap 106, and thus lesser force applied by heel strap 106.

Figure 2:
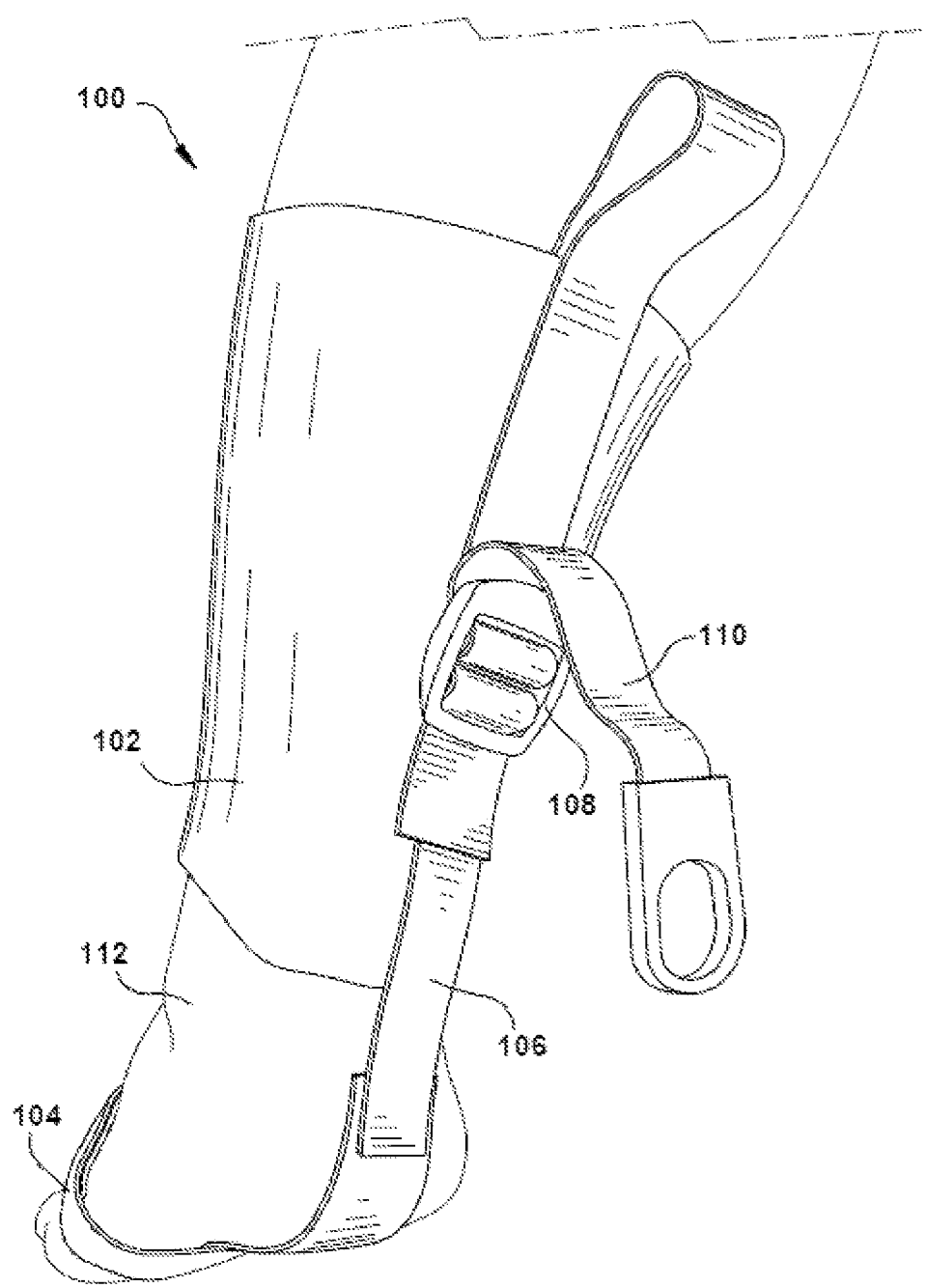
FIG. 2 illustrates a rear perspective view of an example embodiment of a foot positioning device.

FIG. 2 illustrates foot positioning device 100 including proximal strap 102, distal strap 104, and heel strap 106. Heel strap 106 may include adjustment mechanism 108, wherein heel strap 106 may be shortened or lengthened, including by manipulation of tag end 110. Tag end 110 of heel strap 106 may be extended through adjustment mechanism 108 proximally to shorten heel strap 106, and distally to lengthen heel strap 106. Adjustment mechanism 108 may include a triglide buckle.

Figure 3:
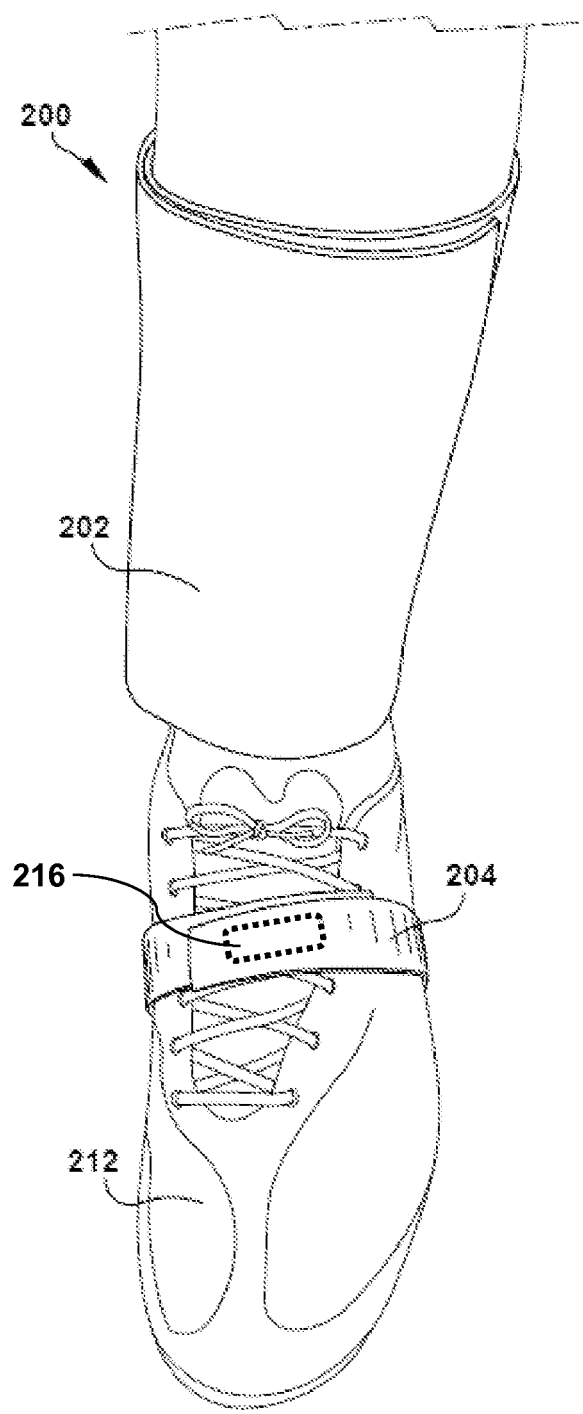
FIG. 3 illustrates a front perspective view of an example embodiment of a foot positioning device.

FIG. 3 illustrates a foot positioning device 200 including a proximal strap 202 and a distal strap 204. Foot positioning device 200 may be fitted over a shoe 212.

Foot positioning device 200 may include an electronic device 216. As illustrated, electronic device 216 may be oriented in distal strap 204. Electronic device 216 may be oriented within, or upon, any portion of foot positioning device 200, including for example proximal strap 202, distal strap 204, a heel strap (not shown), an adjustment mechanism (not shown), a tag end (not shown).

Electronic device 216 may include any of a variety of sensors, including for example: a force sensor, pressure sensor, load cell, or the like. Electronic device 216 may include at least one accelerometer. Electronic device 216 may be configured to measure any of a variety of factors pertinent to athletic activities, including for example: strike force, strike velocity, ball speed, ball spin, angle of swing in a kick, angle of a foot during the kick, acceleration of a foot during the kick, number of repetitions, position on the field, and the like. Electronic device 216 may include an identification device, including for example an RFID tag configured to track the user of the foot positioning device.

Electronic device 216 may be oriented such that at least a portion of it contacts a ball when a user kicks the ball. For example, electronic device 216 may be oriented on the dorsal portion, medial portion, or lateral portion of shoe 212 or a foot (not shown). In such an embodiment, the force, pressure, and the like, imparted from shoe 212 or a foot (not shown) to the ball may be measured. In addition, velocity, acceleration, angle of swing, angle of foot, number of repetitions, and the like may be measured by this placement of electronic device 216. Alternatively, any of these factors may be measured through any orientation of electronic device 216.

In one embodiment, a ball used in athletic activities, such as a soccer ball, football, rugby ball, kick ball, or the like, may include an electronic device configured to measure at least one of the ball's speed, force, spin, velocity, trajectory, and the like. Foot positioning device electronic device 216 may communicate with the ball electronic device to measure any of the factors above, and the like.

Electronic device 216 and the ball electronic device may transmit data to a processor to determine a "good kick" versus a "bad kick." For example, the processor may compare strike velocity (from electronic device 216) to ball velocity (from the ball electronic device) to determine the ratio therebetween, and may output an indication as to whether the kick was a "good kick" or a "bad kick" based upon a threshold value.

Figure 4:
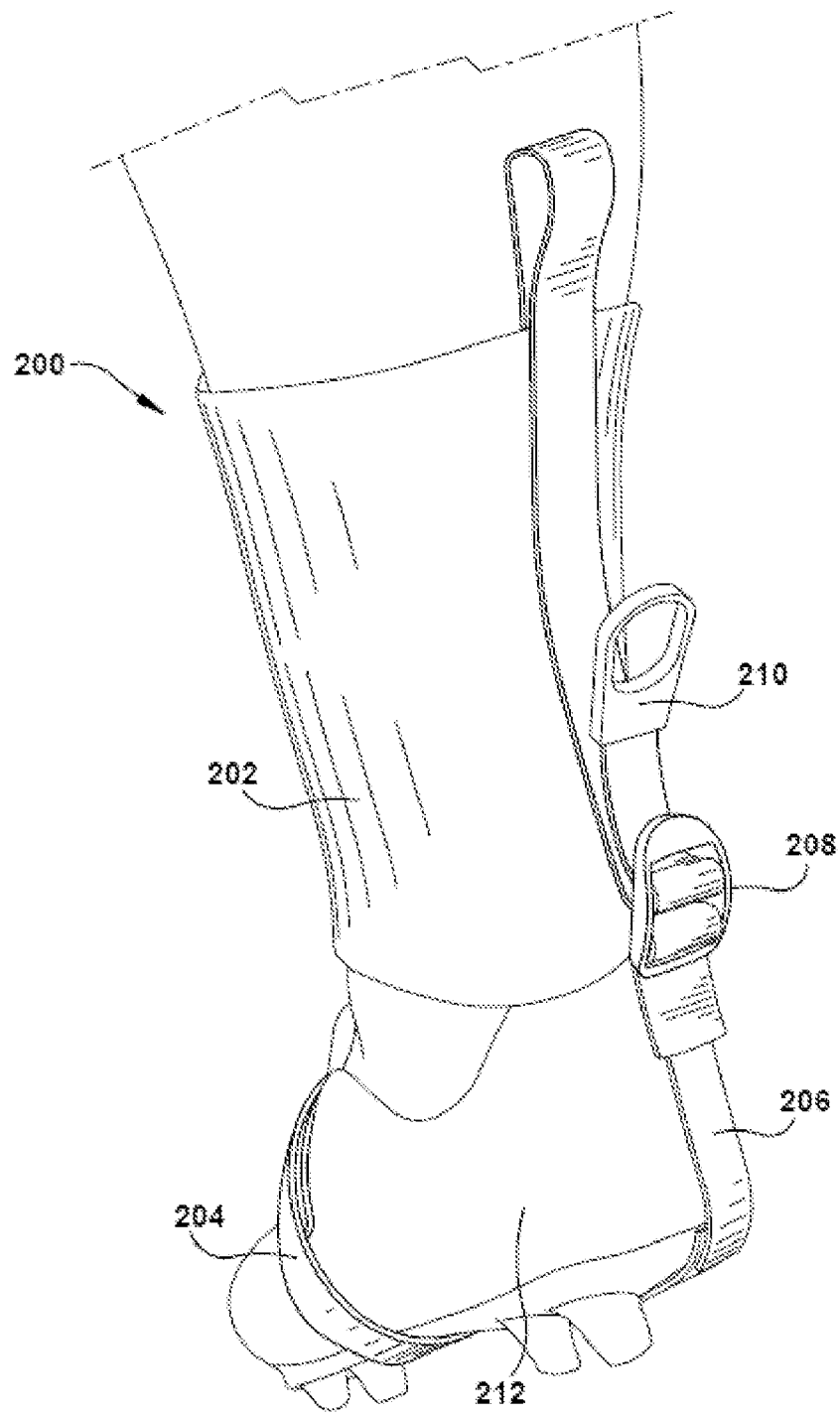
FIG. 4 illustrates a rear perspective view of an example embodiment of a foot positioning device.

FIG. 4 illustrates foot positioning device 200 including proximal strap 202, distal strap 204, and a heel strap 206. Heel strap 206 may include an adjustment mechanism 208, wherein heel strap 206 may be shortened or lengthened, including by manipulation of a tag end 210. Foot positioning device 200 may be oriented over shoe 212. In an alternative embodiment, foot positioning device 200 may be oriented between shoe 212 and an individual's foot (not shown).

Figure 5:
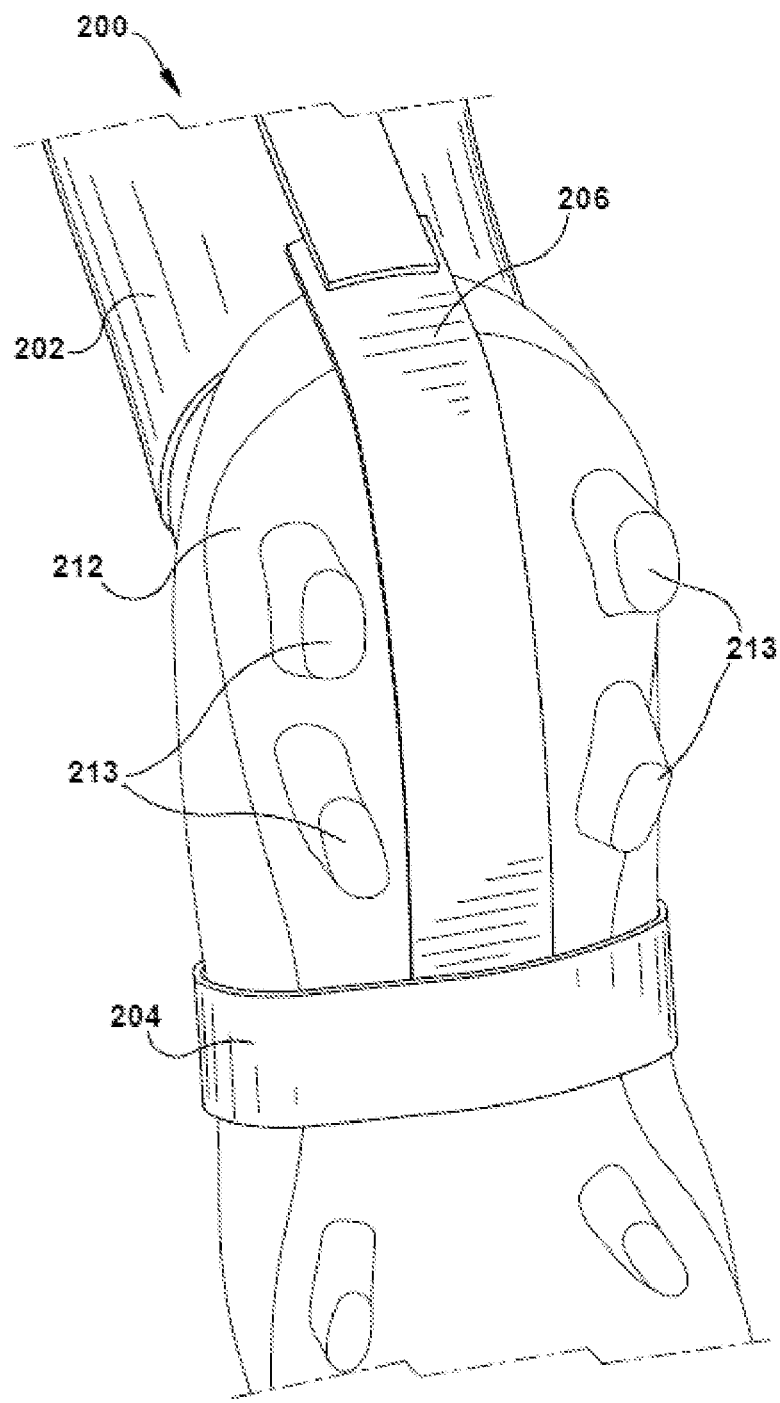
FIG. 5 illustrates a bottom perspective view of an example embodiment of a foot positioning device.

FIG. 5 illustrates foot positioning device 200 including proximal strap 202, distal strap 204, and a heel strap 206. In one embodiment, shoe 212 includes at least one cleat 213, and heel strap 206 is configured to extend between at least one cleat 213. Orientation of heel strap 206 between at least one cleat 213 may act to keep heel strap 206 properly positioned on shoe 212.

Figure 6:
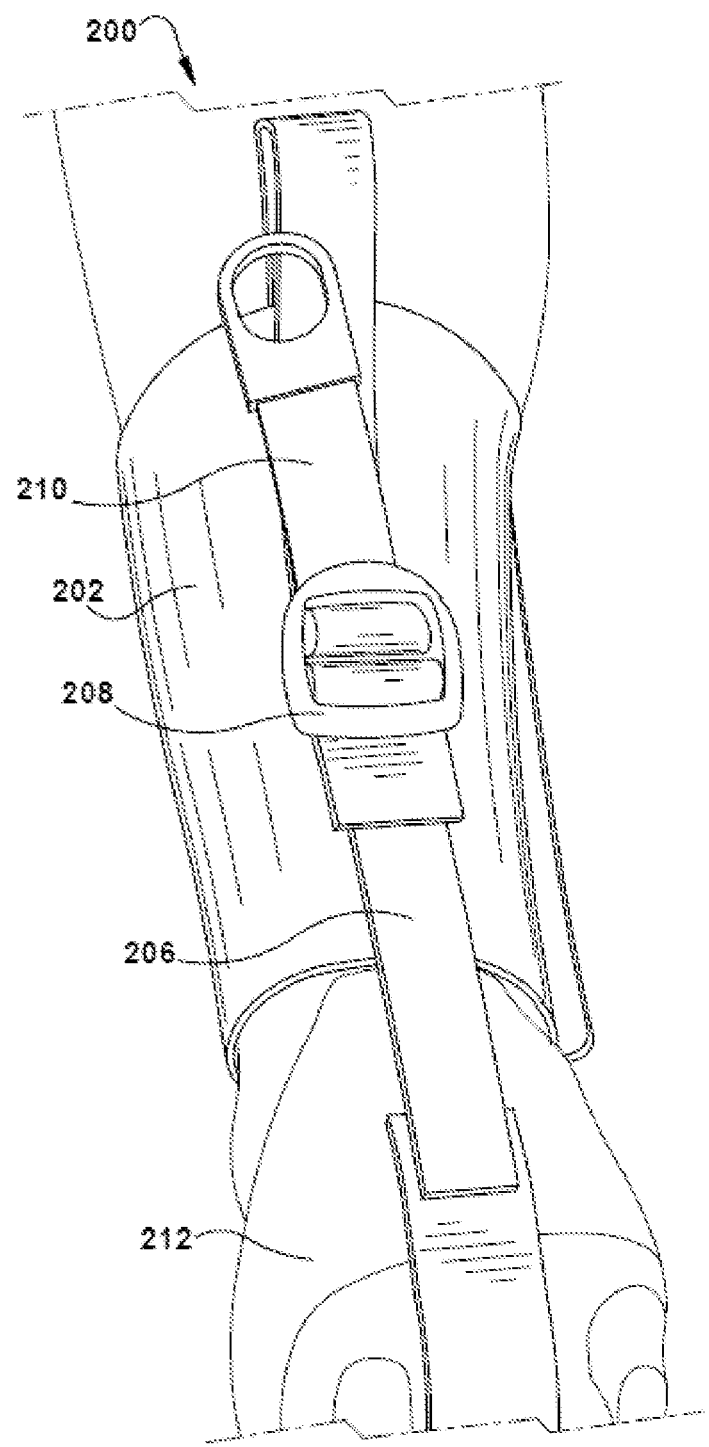
FIG. 6 illustrates a rear perspective view of an example embodiment of a foot positioning device.

FIG. 6 illustrates foot positioning device 200 including proximal strap 202 and heel strap 206. Heel strap 206 may include adjustment mechanism 208, wherein heel strap 206 may be shortened or lengthened, including by manipulation of tag end 210. Foot positioning device 200 may be oriented over shoe 212.

Figure 7:
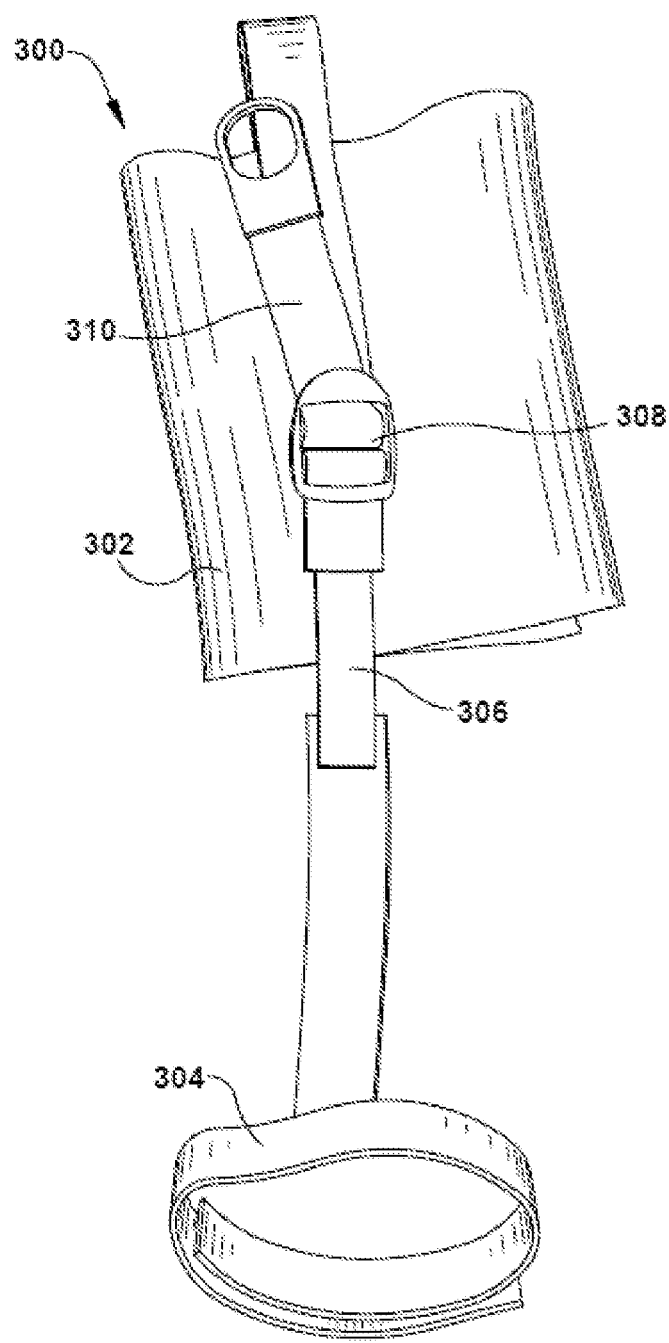
FIG. 7 illustrates a rear view of an example embodiment of a foot positioning device.

FIG. 7 illustrates a foot positioning device 300 including a proximal strap 302, a distal strap 304, and a heel strap 306. Heel strap 306 may include an adjustment mechanism 308, wherein heel strap 306 may be shortened or lengthened, including by manipulation of a tag end 310. Heel strap 306 may comprise an extensible portion and an inextensible portion.

Figure 8:
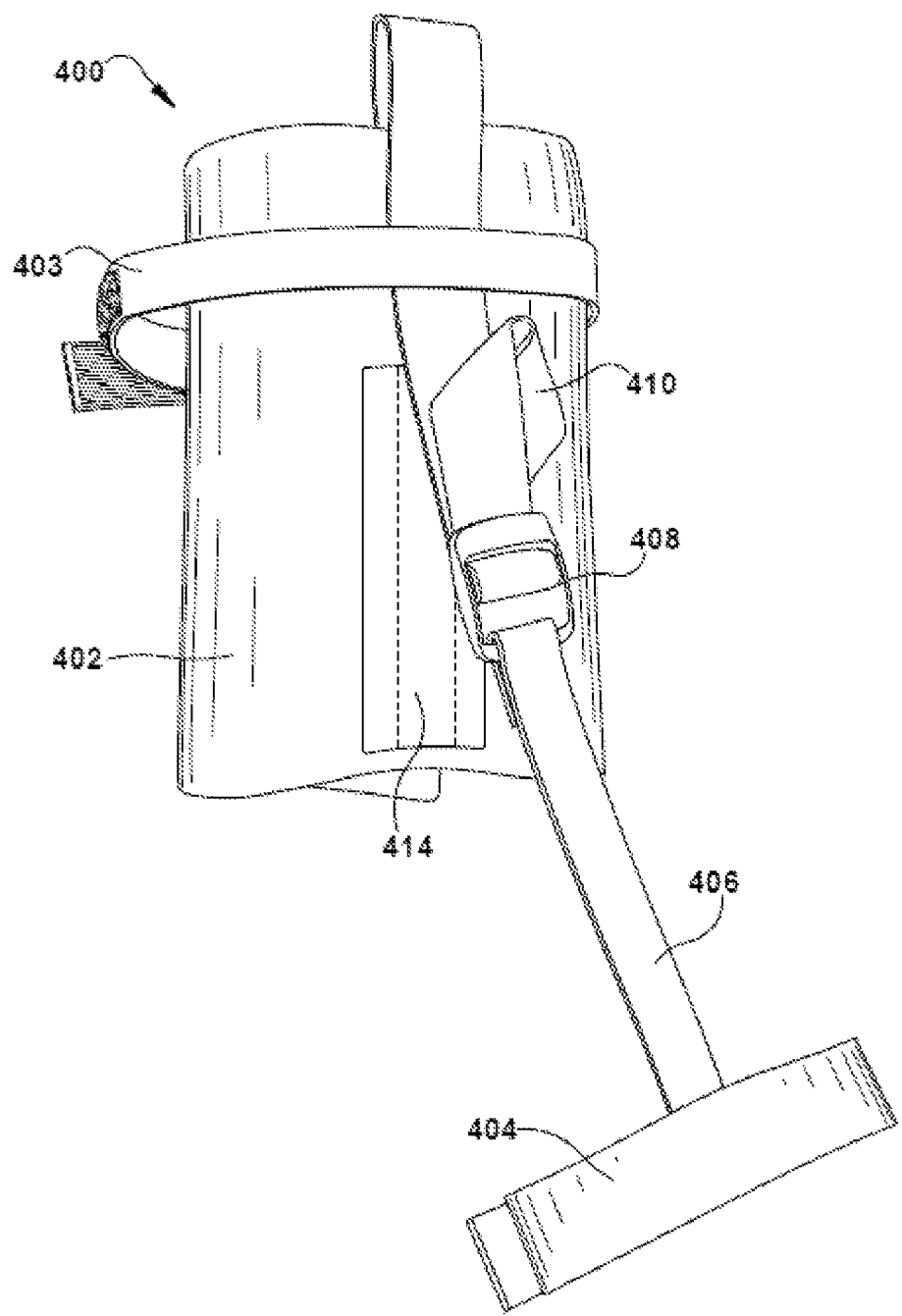
FIG. 8 illustrates a rear view of an example embodiment of a foot positioning device.

FIG. 8 illustrates a foot positioning device 400 including a proximal strap 402, a secondary proximal strap 403, a distal strap 404, and a heel strap 406. Heel strap 406 may include an adjustment mechanism 408, wherein heel strap 406 may be shortened or lengthened, including by manipulation of a tag end 410. Secondary proximal strap 403 may be configured to provide additional adjustment and/or arresting of proximal strap 402 relative to an individual's ankle or lower leg.

Proximal strap 402 may comprise a spine 414 configured to provide additional stiffness and/or support to proximal strap 402. Spine 414 may be configured to prevent collapse of proximal strap 402. Spine 414 may be configured to prevent slippage of proximal strap 402. Spine 414 may be configured to prevent bunching of proximal strap 402. Spine 414 may be configured to prevent rolling of proximal strap 402.

Figure 9:
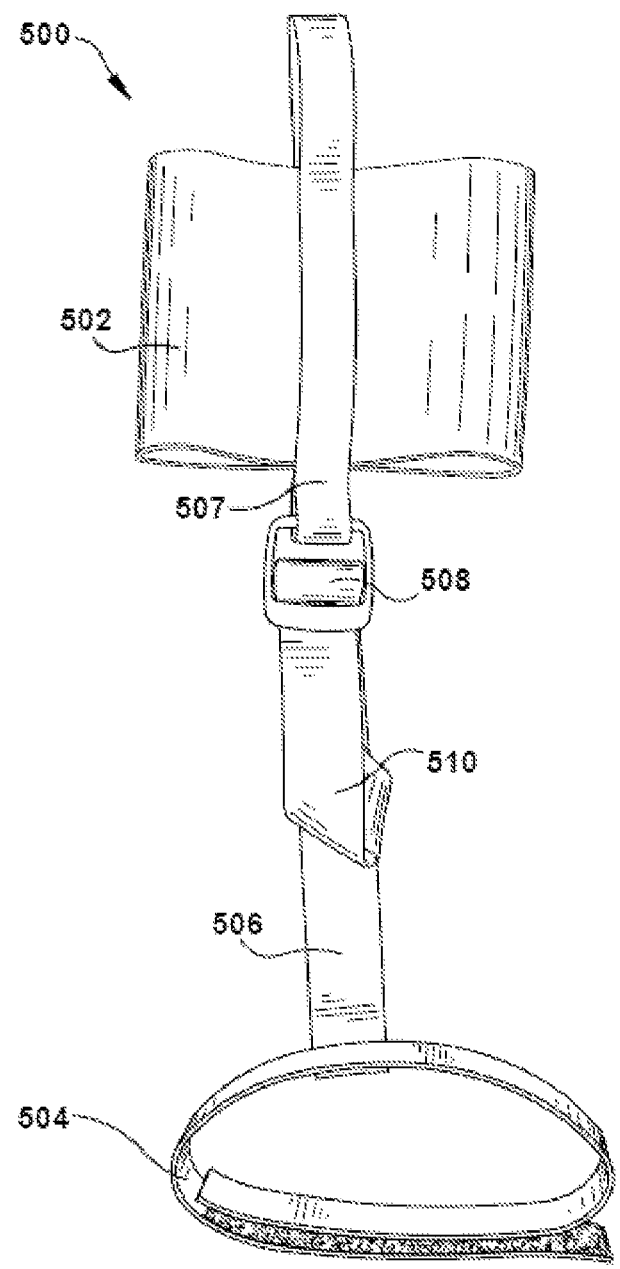
FIG. 9 illustrates a rear view of an example embodiment of a foot positioning device.

FIG. 9 illustrates a foot positioning device 500 including a proximal strap 502, a distal strap 504, and a heel strap 506. Heel strap 506 may include at least one extensible portion 507. Heel strap 506 may include an adjustment mechanism 508, wherein heel strap 506 may be shortened or lengthened, including by manipulation of a tag end 510.

Figure 10:
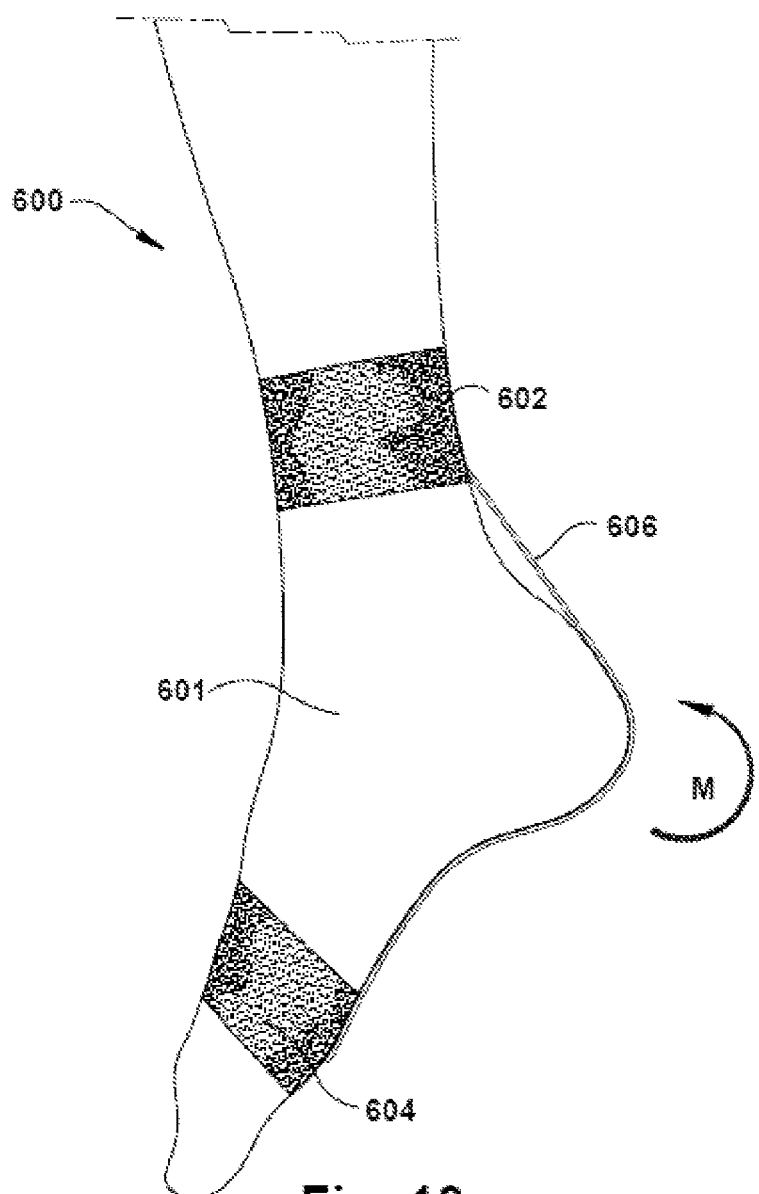
FIG. 10 illustrates a side view of an example embodiment of a foot positioning device.

FIG. 10 illustrates a foot positioning device 600. Foot positioning device 600 may be integrated into a sock 601 configured to be worn by an individual over the individual's foot. Foot positioning device 600 may include a proximal strap 602, a distal strap 604, and a heel strap 606, at least one of which may be integrally connected to sock 601.

In one embodiment, heel strap 606 is configured to provide a force between proximal strap 602 and distal strap 604. Force applied by heel strap 606 may be adjusted as desired by an individual. Force applied by heel strap 606 may cause a moment M biasing an individual's foot toward a plantar flexion position. Heel strap 606 may be configured to cause a moment M in any of a variety of directions, so as to bias an individual's foot into any of a variety of desired positions, including for example: plantar flexion, plantar flexion with eversion, plantar flexion with inversion, and the like. Heel strap 606 may be substantially similar to heel straps described herein in reference to other embodiments of the foot positioning device. Heel strap 606 may include an adjustment mechanism (not shown).

Foot positioning device 600 may be worn by an individual over the individual's foot, but under the individual's shoe, boot, or the like. Foot positioning device 600 may be integrated with an individual's shin guard or other pad. Foot positioning device 600 may be integrated into an individual's sport sock or sleeve.

Figure 11:
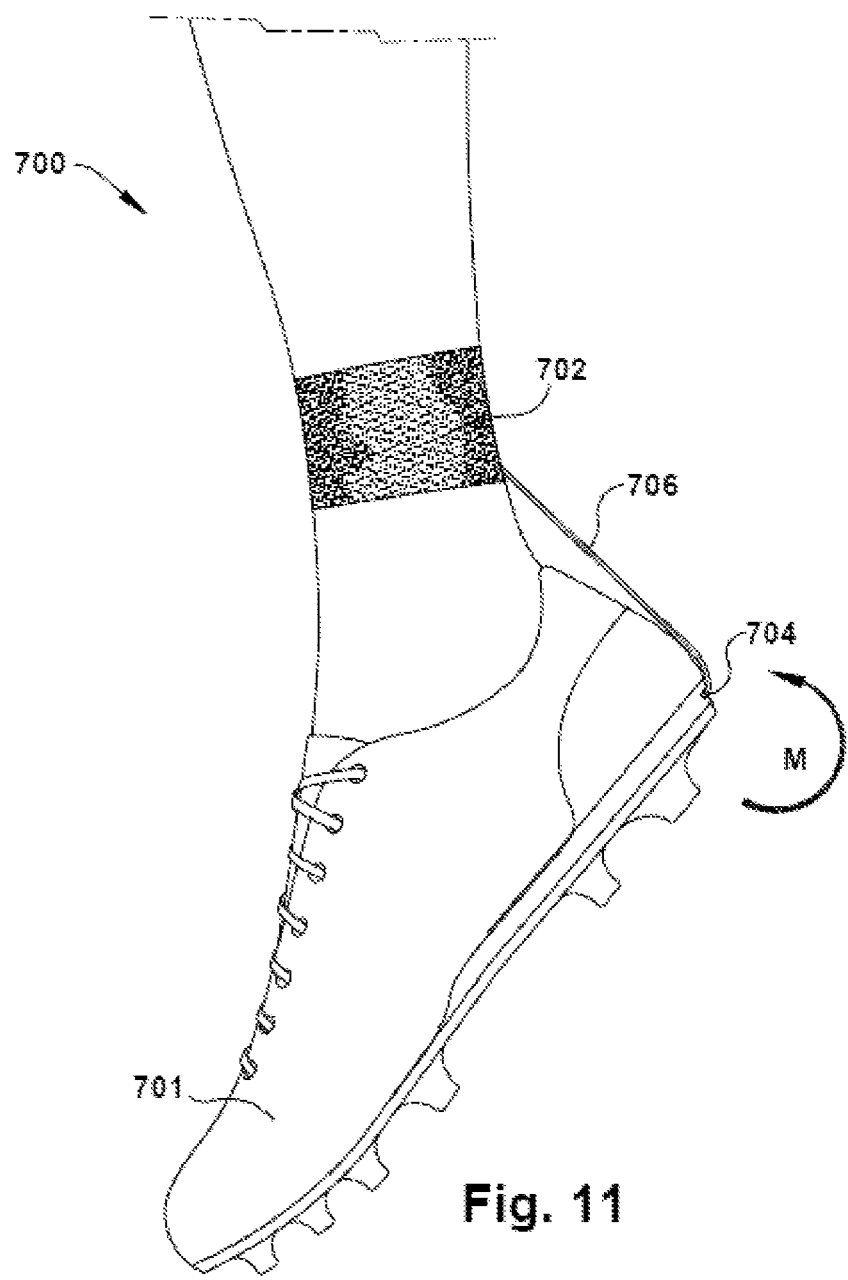
FIG. 11 illustrates a side view of an example embodiment of a foot positioning device.

FIG. 11 illustrates a foot positioning device 700. Foot positioning device 700 may be configured to attach to a specific shoe 701. Foot positioning device 700 may comprise a proximal strap 702, a shoe attachment point 704, and a heel strap 706. Heel strap 706 may be configured to attach to shoe attachment point 704 and provide a force between proximal strap 702 and shoe 701. Shoe attachment point 704 may be oriented on shoe 701 in any of a variety of positions, including on shoe 701's heel, sole, toe, upper, and the like. Foot positioning device 700 may be configured to cause a moment M, which may be configured to bias an individual foot toward any of a variety of desired positions, including for example: plantar flexion, plantar flexion with eversion, plantar flexion with inversion, and the like.

Heel strap 706 may connect to shoe attachment point 704 via any of a variety of means. Heel strap 706 may be removably connected to shoe attachment point 704. Heel strap 706 may be permanently connected to shoe attachment point 704. Heel strap 706 may attach to shoe attachment point 704 via at least one of a hook, a clasp, a clip, a bolt, a screw, a nail, a hook and loop fastener, a magnet, an adhesive, and the like. Heel strap 706 may include an adjustment mechanism (not shown).

In practice, an individual may use any foot positioning device herein described to obtain, maintain, and/or bias the individual's foot in or toward a desired position, such as a plantar flexion position during a non-weight bearing state, for engaging in any activity, including an athletic activity. An individual may place any foot positioning device herein described over at least one of the individual's foot, sock, shoe, boot, and the like. The individual may tighten a proximal strap to a level necessary to substantially arrest the proximal strap relative to the individual's foot, while allowing the individual to voluntarily move the individual's foot. The individual may similarly tighten a distal strap, if any, to a level necessary to substantially arrest the distal strap relative to the individual's foot, while allowing the individual to move the individual's foot. The individual may adjust the heel strap until a desired force is applied by the heel strap to obtain, maintain, and/or bias the individual's foot to a preferred position.

It is contemplated that electronic device 216 referenced in FIG. 3 above can likewise be included in any of foot positioning devices 100, 300, 400, 500, 600, and 700. It is contemplated that the electronic device would work in these other embodiments in the same manner as discussed with reference to electronic device 216 in FIG. 3.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to indicate a nature of an element and/or a relationship between elements within a reasonable degree of precision and tolerance as is acceptable in the relevant field of technology. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A foot positioning device, comprising:
   a proximal strap configured to be worn in a secured position wrapped around an individual's ankle or lower leg;
   a distal strap configured to be worn in a secured position wrapped around the individual's foot; and
   a heel strap configured to interconnect the proximal strap to the distal strap in an operative condition reaching posteriorly about the individual's heel when the proximal and distal straps are worn in their secured positions;
   wherein the heel strap, when in the operative condition, has a limited length stabilizing the individual's foot in a plantar flexion position.

2. The device of claim 1, wherein the heel strap includes means for adjusting the plantar flexion position by adjusting the limited length of the heel strap in the operative condition.

3. The device of claim 1, wherein the heel strap applies a force between the proximal strap and the distal strap and thereby causes a moment biasing the individual's foot in a direction from a neutral position toward the plantar flexion position when the heel strap is in the operative condition.

4. The device of claim 3, wherein the heel strap applies a force that is between about 10% and about 40% of the individual's body weight.

5. The device of claim 3, wherein the heel strap applies a force between about 44.0 N and about 222.0 N.

6. The device of claim 1, wherein the heel strap is configured to stretch when in the operative condition.

7. The device of claim 3, further comprising means for adjusting the force.

8. The device of claim 1, further comprising a sock to which the proximal strap, the distal strap, and the heel strap are integrally connected.

9. A foot positioning device, comprising:
   a shoe having a heel portion located at the posterior of an individual's heel when worn on the individual's foot;
   a proximal strap configured to be worn in a secured position wrapped around the individual's ankle or lower leg above the shoe; and
   a heel strap configured to interconnect the proximal strap with the heel portion of the shoe in an operative condition reaching posteriorly from the proximal strap to the heel portion of the shoe when the proximal strap is worn in the secured position;
   wherein the heel strap, when in the operative condition, has a limited length stabilizing the shoe and the individual's foot in a plantar flexion position.

10. The device of claim 9, wherein the heel strap includes means for adjusting the limited length of the heel strap in the operative position.

11. The device of claim 9, wherein the heel strap applies a force between the proximal strap and the heel portion of the shoe and thereby causes a moment biasing the shoe and the individual's foot in a direction from a neutral position toward the plantar flexion position when the heel strap is in the operative condition.

12. The device of claim 11, wherein the heel strap applies a force that is between about 10% and about 40% of the individual's body weight.

13. The device of claim 11, wherein the heel strap applies a force between about 44.0 N and about 222.0 N.

14. The device of claim 9, wherein the heel strap is configured to stretch when in the operative condition.

15. The device of claim 11, further comprising means for adjusting the force.

* * * * *